United States Patent [19]

Halvorsen

[11] Patent Number: 4,962,889
[45] Date of Patent: Oct. 16, 1990

[54] AIRBLAST FUEL INJECTION WITH ADJUSTABLE VALVE CRACKING PRESSURE

[75] Inventor: Robert M. Halvorsen, Birmingham, Mich.

[73] Assignee: Fuel Systems Textron Inc., Walled Lake, Mich.

[21] Appl. No.: 336,774

[22] Filed: Apr. 12, 1989

Related U.S. Application Data

[63] Continuation-in-part of Ser. No. 131,579, Dec. 11, 1987, Pat. No. 4,831,700.

[51] Int. Cl.⁵ ............................. B05B 7/10; B05B 7/06
[52] U.S. Cl. .................................... 239/410; 239/406; 239/424.5; 239/533.2; 239/533.6; 137/855; 251/158; 60/741; 123/531; 123/590
[58] Field of Search ............... 239/400, 402, 405, 406, 239/408, 410, 413, 412, 416.5, 417.3, 424.5, 533.1, 533.2, 570, 571, 425, 416.1, 424, 410; 137/527, 855, 513.5; 251/170, 158; 123/531, 590; 60/740-742

[56] References Cited

U.S. PATENT DOCUMENTS

| | | | |
|---|---|---|---|
| 2,107,998 | 2/1938 | Rullison | 251/119 |
| 2,144,874 | 1/1939 | Edwards | 239/533.4 |
| 2,574,865 | 11/1951 | Edwards | 299/118 |
| 2,893,647 | 7/1959 | Wortman | 239/464 |
| 3,310,240 | 3/1967 | Grundman | 239/404 |
| 3,598,321 | 8/1971 | Bobzin | 239/400 |
| 3,684,186 | 8/1972 | Helmrich | 239/400 |
| 3,980,233 | 9/1976 | Simmons et al. | 239/400 |
| 4,170,108 | 10/1979 | Mobsby | 239/406 |
| 4,600,151 | 7/1986 | Bradley | 239/406 |
| 4,754,922 | 7/1988 | Halvorsen et al. | 239/5 |
| 4,842,197 | 6/1989 | Simon et al. | 239/400 |

FOREIGN PATENT DOCUMENTS

1775973  5/1973  Fed. Rep. of Germany.

Primary Examiner—Andres Kashnikow
Assistant Examiner—Christopher G. Trainor
Attorney, Agent, or Firm—Edward J. Timmer

[57] ABSTRACT

An airblast fuel injector tip is provided for reducing fuel vaporization problems as a result of high fuel temperatures without adversely affecting the airblast operational characterisitics of the injector tip. The injector tip includes a fuel receiving chamber and an arcuate valve member movable relative to a valve seat member having a fuel discharge port for discharging fuel flow into the fuel receiving chamber as metered by the valve member in dependence on the pressure of fuel. The valve seat member is adjustably received on the injector tip and preferably includes a deflectable portion accessible externally of the injector tip for facilitating adjustment of the valve cracking pressure.

9 Claims, 1 Drawing Sheet

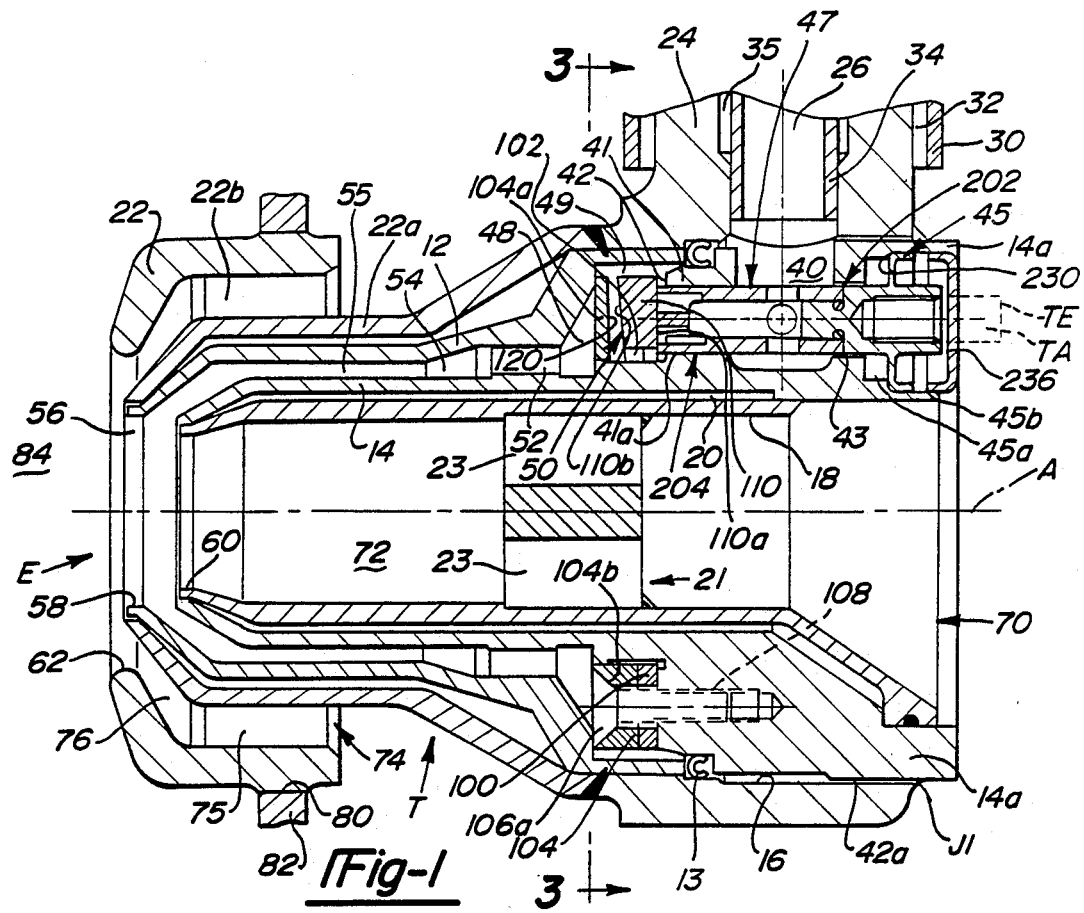
Fig-1
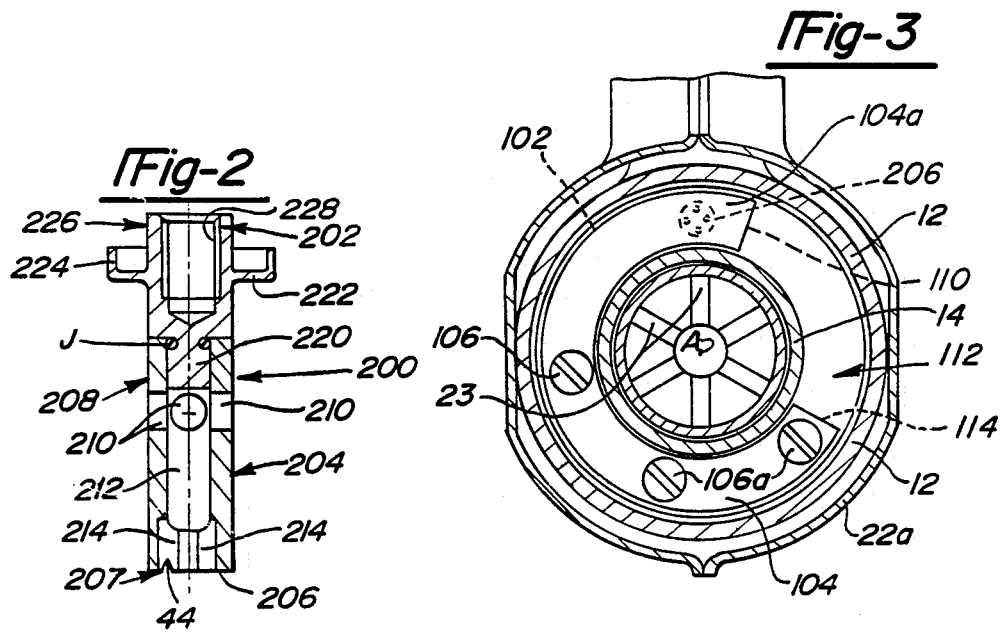
Fig-2
Fig-3

AIRBLAST FUEL INJECTION WITH ADJUSTABLE VALVE CRACKING PRESSURE

This is a continuation-in-part of patent application Ser. No. 131 579, now U.S. Pat. No. 4,831,700, filed 12-11-87.

FIELD OF THE INVENTION

The invention relates to fuel injector constructions especially for gas turbine engines and methods for vapor lock prevention and, in particular, to airblast fuel injector constructions having a special valving configuration in the injector tip near the injector discharge end for providing a high fuel pressure drop to reduce fuel vaporization resulting from high temperatures.

BACKGROUND OF THE INVENTION

U.S. Pat. No. 3,684,186 issued Aug. 16, 1972, to William F. Helmrich discloses in FIG. 2 a known airblast fuel injector for gas turbine engines wherein the injector has generally concentric chambers for inner and outer air flows and intermediate fuel flow and generally concentric discharge orifices for discharging and intermixing inner and outer air flows and the fuel flow. U.S. Pat. No. 3,980,233 issued Sept. 14, 1976, to Harold C. Simmons illustrates an airblast fuel injector of similar construction for a gas turbine engine. Because of the typical low pressure drop of a prior art airblast type injector, such airblast injector has employed a fuel metering valve in a housing on the opposite end of an injector support strut considerably upstream from the injector tip and outside the combustor case to compensate for pressure head effects and provide adequate fuel distribution to the engine combustor. As a result, fuel back pressure is maintained only to a valve which is considerably upstream from the injector tip. The low fuel back pressure at the airblast injector tip, actually from the remote upstream fuel valve to the injector tip, makes the fuel downstream of the valve prone to vaporization when fuel temperature increases as explained in the next paragraph. In addition, the fuel passages downstream from the metering valve to the injector tip are circuitous and often small in size, being prone to vapor lock with adverse consequences as will be explained in the next paragraph.

As mentioned in U.S. Pat. No. 4,754,922, there has been an effort to increase the power (thrust) and efficiency of gas turbine engines especially for military use by raising operating temperature of the hot gas generated in the combustor for subsequent flow to the turbine and past the engine outlet. Although airblast fuel injectors of the type shown in FIG. 2 of the Helmrich U.S. Pat. No. 3,684,186 have performed satisfactorily in the current gas turbine engine where fuel temperature is about 250° F. at the injector tip, initial tests of the same fuel injectors in higher temperature engines where fuel temperature at the injector tip is within the range of 300° F. to 400° F. have evidenced a problem of fuel vaporization in the fuel passages downstream from the fuel metering valve and at the injector tip from the higher temperatures involved. The fuel vaporization results in vapor lock condition in the fuel passages causing pulsing or intermittent interruptions in fuel flow from the injector which in turn causes combustion instability and adversely affects operation of the engine.

Aforementioned U.S. Pat. No. 4,754,922 describes an airblast fuel injector and method for reducing fuel vaporization in an airblast fuel injector tip by positioning a cantilever spring fuel metering valve at an upstream axial location relative to the fuel discharge orifice to reduce fuel vaporization upstream of the valve location and yet provide for formation of a fuel stream amenable to the airblast effect of the inner air stream such that the airblast operational characteristics of the injector are not adversely affected.

U.S. Pat. No. 3,598,321 issued Aug. 10, 1971, to Darrel G. Bobzin illustrates a fuel injector construction for a gas turbine engine having multiple rectilinear leaf spring valves carried on a cylindrical valve plate with each leaf spring valve received in a chordal type slot in the valve plate for controlling fuel flow between cylindrical passages extending from the outer periphery to an inner cylindrical bore in the valve plate. However, the fuel injector disclosed is not an airblast fuel injector and is not exposed to higher fuel temperatures associated with recently developed engines.

U.S. Pat. No. 2,107,998 issued Feb. 8, 1938, to E. A. Rullison describes an air valve carburation device wherein a flexible annular reed valve is held on a supporting disk and against a valve seat to control air flow to an engine and is opened by a vacuum condition in the carburetor.

SUMMARY OF THE INVENTION

The invention contemplates an airblast fuel injector useful for reducing fuel vaporization at elevated fuel temperatures.

The invention involves an airblast fuel injector having injector body means for forming an inner air chamber having a downstream air discharge orifice, an outer air chamber having a downstream air discharge orifice and an annular fuel chamber between the inner and outer air chambers with a downstream fuel discharge orifice. A longitudinal passage in the injector body means communicates the fuel chamber to an upstream fuel inlet chamber. A tubular valve seat member is adjustably received in the passage and includes a fuel bore terminating in a downstream fuel discharge port. An arcuate spring valve is disposed on the injector body means and includes a cantilever end portion overlying the fuel discharge port and biased toward the valve seat member over the fuel port when fuel pressure is below a minimum value corresponding to a valve cracking pressure. The tubular valve seat member is adjustable in position in the longitudinal passage relative to the cantilever end portion of the valve means to adjust the valve opening (or cracking) pressure. The valve seat member includes a portion, preferably a deflectable portion, accessible externally of the injector tip to facilitate adjustment of the cracking pressure.

BRIEF DESCRIPTION OF THE DRAWINGS

FIG. 1 is a longitudinal cross-sectional view of one embodiment of an airblast fuel injector tip of the invention.

FIG. 2 is a longitudinal sectioned view of the adjustable valve seat member of FIG. 1.

FIG. 3 is a cross-sectional view of the fuel injector taken along lines 3—3 of FIG. 1.

DESCRIPTION OF PREFERRED EMBODIMENTS

FIGS. 1-3 illustrate an airblast type of fuel injector useful for a higher temperature gas turbine engine with an injector tip T constructed in accordance with the invention to provide higher fuel pressure drop and reduced fuel vaporization from fuel temperatures in the general range of 300° F. to 400° F. at the injector tip.

The fuel injector tip includes an outer injector body 12 and inner injector body 14 with the latter received in a longitudinal bore 16 in the former. A C-shaped seal 13 is disposed between the injector bodies 12,14 to prevent fuel leakage. A tubular heat shield body 18 is attached as by welding or other means inside the inner injector body 14 to provide a heat insulating dead air space 20. An air swirler member 21 having swirl vanes 23 is disposed fixedly in the heat shield body 18. A tubular outer shroud 22 having inner tubular wall 22a and air swirl vanes 22b is attached as by welding or other means on the exterior of the outer injector body 12 for purposes to be explained.

As is apparent, the outer injector body 12 and inner injector body 14 are tubular in shape. Outer injector body 12 includes lateral tubular extension or support strut 24 which includes a fuel passage 26 for receiving pressurized fuel from a fuel pump (not shown) in known manner. The support strut 24 is welded to the outer injector body 12 as shown. As is known, the support strut 24 includes a mounting flange (not shown) at the end opposite from the fuel injector tip for attachment to a casing of the engine to support the injector tip as shown in FIG. 1 relative to the combustor 84 and terminates at the opposite end in a fitting (not shown) for connection to a fuel line. An external heat shield 30 is attached around extension 24 to provide air space 32. Similarly, an internal heat shield sleeve 34 is attached in fuel passage 26 to provide heat insulating air space 35.

The inner and outer injector bodies 12,14 include generally cylindrical cross-section tubular portions along their lengths extending toward the discharge end E of the fuel injector, the cylindrical portions being generally concentric relative to longitudinal axis A of the injector. As will be described, various fuel chambers and passages are formed between the nested cylindrical portions of the inner and outer injector bodies 12,14 and shroud 22.

In FIG. 1, inner and outer injector bodies 12,14 define a fuel inlet chamber 40 machined predominantly in the inner injector body with fuel inlet chamber 40 being in fuel flow relation to the fuel passage 26 to receive fuel therefrom. The fuel inlet chamber 40 extends only partially around the circumference of the large diameter end portion 14a of the outer injector body 14 such that an arcuate outer circumferential flange 41 is formed.

As is apparent from FIG. 1, the flange 41 includes a cylindrical passage 41a extending longitudinally (axially) downstream from the chamber 40 to a downstream-facing shoulder 42 on the flange 41. Coaxial with the bore 41a is a first small diameter cylindrical bore 43 and a second larger diameter cylindrical counterbore 45 formed upstream in portion 14a of the outer injector body 14. Counterbore 45 has an inner bore portion 45a and a larger diameter outer bore portion 45b. It is apparent that the outer bore portion 45b of the counterbore 45 opens upstream (or rearwardly) to the outside of the outer injector body 14 (i.e., external thereof).

Adjustably, slidably received in the coaxial bores 41a,43 and 45 as well as fuel inlet chamber 40 is an elongate valve seat insert member 47 to be described in further detail hereinbelow.

The downstream-facing annular shoulder 42 and a cylindrical outer periphery 42a on portion 14a of the inner injector body 14 nest in cylindrical bore wall 16 in the outer injector body. Of course, the shoulder could be provided on outer injector body 12.

Fuel flow from fuel inlet chamber 40 through the valve seat insert member 47 is controlled by an annular spring valve 50 mounted on the annular shoulder 42 for seating against the valve seat member 47 as will be described in greater detail hereinbelow.

Fuel flows from fuel chamber 40 through the valve seat member 47 and into fuel receiving chamber 49. The fuel then flows to and swirls tangentially or circumferentially in converging conical fuel receiving chamber 48 from which the fuel then flows to annular chamber 52 and then to annular conical swirl chamber 54 through downstream annular chamber 55 for discharge through orifice 56 past annular fuel discharge lip 58 in the form of a fuel spray cone.

As the fuel spray cone discharges from lip 58, it is intermixed with inner and outer air discharging past inner and outer air discharge lips 60,62 respectively. Inner air discharging from lip 60 enters the upstream end 70 of inner injector body 14 and flows through cylindrical longitudinal bore 72 in the inner injector body. Air swirler 21 imparts swirl to the inner air flow in known manner. Outer air discharging past outer air discharge lip 62 enters upstream end 74 of the outer air shroud 22 and passes air swirl vanes 75 and through air swirling chamber 76 for discharge past lip 62. As is known, the air received in the inner injector body 14 and shroud 22 is received from the upstream compressor (not shown) of the gas turbine engine. Typically, outer shroud 22 includes a mounting surface 80 which is adapted to engage the combustor wall 82 downstream of the compressor so that the fuel and inner and outer air flows are discharged into the internal combustor chamber 84 for burning.

The annular spring valve 50 for controlling fuel flow from fuel chamber 40 and valve seat member 47 is shown in FIGS. 1 and 3. As shown, the spring valve 50 is annular and includes an arcuate fixed end portion 100 and cantilever arcuate end portion 102 which flexes relative to fixed end portion 100 per U.S. Pat. No. 4,754,922. Fixed end portion 100 is fixedly mounted on annular shoulder 42 by C-shaped retainer member 104 and multiple machine screws 106. Screws 106 are threaded into individual threaded bores 108 extending longitudinally into shoulder 42 and inner injector body 14. The thickness of the spring valve 50 is uniform except at the free end of the cantilever portion 102 where an enlarged (in the thickness direction) valve head 110 is provided. As shown best in FIG. 1, valve head 110 includes a seat surface 110a and a downstream control surface 110b adapted to abut shoulder 120 of an insert 122 retainer end portion 104a disposed in the outer injector body 12 to limit the maximum opening of the spring valve 50 at maximum fuel pressure. The retainer member 104 includes the reduced thickness end portion 104a that overlies in the downstream direction the valve head 110 to act as a stop to limit travel of the valve head.

A slot 112 in the valve spring 50 separates the cantilever valve head 110 from the end 114 of the fixed portion 100 which end 114 is spaced circumferentially from head 110. This end 114 may be provided with an inclined ramp not shown but see U.S. Pat. No. 4,754,922 extending circumferentially away from valve head 110 in the circumferential direction relative to the longitudinal axis A and over which fuel discharging from the valve seat member 47 passes without interference to its flow direction and swirl. Heads 106a of machine screws 106 are recessed in counterbores 104b in the retainer member for the same purpose.

The spring valve 50 is made of a resilient material, such as INCONEL X750, 17-7PH stainless steel RENE 41 or WASPALOY, and, when formed into a shape shown in the figures and having seat surface 110a abutted against valve seat member 47, exerts a spring, bias of the valve head 110 against valve seat member 47 to prevent fuel flow under certain conditions as will be explained below. The spring valve 50 is of the type described in U.S. Pat. No. 4,754,922, the teachings of which are incorporated herein by reference.

In particular, as shown best in FIG. 1, the valve head 110 of the spring valve 50 includes the seat surface 110a adapted to abut against the valve seat insert member 47 when fuel pressure is below a desired or preselected minimum fuel pressure for valve cracking or opening to prevent fuel flow to fuel receiving chamber 49, except for a small flow through a slot 44 as will be explained below. Once the spring valve 50 opens, fuel flow is metered to fuel receiving chamber 49 in a predetermined relationship of fuel flow rate versus fuel pressure throughout the operational fuel flow range of the fuel injector.

The, valve seat insert member 47 is shown in FIGS. 1 and 2 as including a valve seat body 200 comprising an upstream body portion 202 and downstream body portion 204 brazed together at joint J. The downstream body portion 204 includes an annular valve seat surface 206 on the downstream end 207 thereof adapted to sealingly engage the valve head 110 when the fuel is below the aforementioned minimum fuel pressure for valve cracking. The body portion 204 also includes an upstream end 208 having a plurality of radially extending fuel cross bores 210 that communicate in fuel flow relation with an axially extending central longitudinal fuel bore 212. Fuel bore 212 terminates short of the valve seat surface 206 in a plurality (e.g., 4 in number) of cylindrical fuel metering discharge apertures 214. Fuel metering discharge apertures 214 extend to the valve seat surface 206 and are spaced circumferentially in the body 204.

As shown in FIGS. 2, a radially extending fuel discharge slot 44 is machined or otherwise formed through the valve seat surface 206 such that the slot 44 is always open and places fuel inlet chamber 40 in fuel flow relation to fuel receiving chamber 49. Slot 44 meters fuel from the fuel inlet chamber 40 to the fuel receiving chamber 49 when the spring valve 50 is seated and closed against valve seat surface 206. Slot 44 is self-cleaning in that once the spring valve 50 is opened, the high flow rate of fuel therepast will cleanse the smaller slot 44 of any dirt or foreign matter. Slot 44 is optionally provided for a staged fuel flow versus fuel pressure curve. Its omission provides an unstaged fuel flow verse fuel pressure curve.

The upstream end of the central fuel bore 212 is sealingly closed off by the nose 220 of the upstream body portion 202 and the brazed joint J.

The upstream body portion 202 includes a radially and circumferentially extending deflectable (controlled thin cross-section) flange 222 having an axially and circumferentially extending cylindrical sealing rim 224 adjacent the upstream end 226 thereof. A threaded axially extending counterbore 228 is formed in the upstream end 226 as shown.

Referring to FIG. 1, it is apparent that the downstream body portion 204 is received in the axial cylindrical bore 41a and the fuel inlet chamber 40 while the upsteam body portion 202 is received in the cylindrical bore 43 and cylindrical counterbore 45. In particular, the downstream body portion 204 is received with a controlled light press fit in bore 41a for limiting leakage of fuel therearound. On the other hand, adjacent portions of the downstream body portion 204 and the upstream body portion 202 are received with a clearance fit in the axial bore 43. In addition, the deflectable flange 222 abuts an annular shoulder 230 formed at the junction of bore portions 45a,45b. The rim 224 is brazed to the wall defining bore portion 45b. The rim 224 is thus fixedly attached or secured to the inner nozzle body 14. A removable snap-in cap 236 is received in the bore portion 45b for heat shielding and protection against tampering with the position of the valve seat insert member 47. When the snap-in cap 236 is removed, the upstream end 226 of the valve seat member 47 is accessible for adjustment of the longitudinal (axial) position thereof relative to the valve head 110 for purposes of adjusting the desired valve cracking or opening pressure.

In particular, the position of the valve seat member 47 is axially varied to move the valve seat surface 206 axially toward or away from the valve head 110 in order to set a desired valve cracking or opening pressure. This axial movement of the valve seat member 47 is effected by screwing a suitable adjustment tool TA (e.g., a cylindrical shaft shown in phantom in FIG. 1) into the threaded counterbore 228. The free end TE of the tool TA then is tapped or struck carefully with a suitable hammer or other device to move (push) the valve seat member 47 to the left in FIG. 1 or is pulled to the right in FIG. 1 to permanently (plastically) deflect or deform the flange 222 typically on the order of plus or minus 0.002 inch to move the valve seat surface 206 a corresponding distance axially (toward or away) relative to the valve head 110 as needed to adjust valve cracking or opening pressure, to the desired value. Ordinarily, the valve seat surface 206 can be initially assembled in the bores 41a,43,45 and chamber 40 to within plus or minus 0.002 inch of the proper position for the desired valve cracking pressure. The remaining plus or minus 0.002 inch adjustment is then accomplished by axially deforming the flange 222 toward or away from the valve head 110 as described above after the valve seat member 47 is assembled in the inner injector body 14.

The clearance fit of the valve seat member 47 (e.g., the adjacent portions of the body portions 202,204) in the axial bore 43 facilitates axial repositioning of the valve seat surface 206 in that only the light press fit of the downstream body portion 204 of the valve seat member 47 in bore 41a must be overcome to achieve the desired axial movement of the valve seat member 47 relative to the valve head 110.

In order to effect adjustment of the position of the valve seat member 47 in the abovedescribed manner without damage to the flange 222, the flange 222 is rendered sufficiently ductile to withstand and retain the permanent deflection imparted thereto during the adjustment procedure. To this end, the axial thickness of the flange 222 is controlled (e.g., to within about 0.010 inch to about 0.015 inch for a deflection of plus or minus 0.002 inch). The physical properties of the flange material are also controlled to this same end. For example, the upstream body portion 202 is made of Type 347 austenitic stainless steel which is fully annealed as a result of furnace brazing of the rim 224 to the inner nozzle body 14, i.e., in counterbore 45b. Typically, the downstream body portion 204 is made of the known GREEK ASCOLOY superalloy.

The valve seat member 47 can be adjusted in the manner described above upon initial assembly thereof in the inner nozzle body 14 without simulated fuel flow. The position of the valve seat member 47 can be subsequently adjusted to achieve the desired valve cracking pressure after the inner nozzle body 14 (with the spring valve 50 and valve seat member 47 assembled thereon) is assembled within the outer nozzle body 12 and joined thereto by a weld joint J1. In particular, the valve seat member 47 can be adjusted in axial position relative to the valve head 11? in the assembled fuel injector using simulated fuel flow and the tool TA engaged in externally accessible counterbore 228 of the valve seat member 47.

Of course, the tool TA is removed after adjustment of the valve seat member 47. Moreover, after the final adjustment using the simulated fuel flow in the assembled fuel injector, the snap-in cap 236 is positioned in counterbore 45b for the purposes stated above.

In operation of the fuel injector of FIG. 1, as the fuel spray cone discharges from lip 58, it is intermixed with inner and outer air discharging past inner and outer air discharge lips 60,62, respectively. Inner air discharging from lip 60 enters the upstream end 70 of inner injector body 14 and flows through cylindrical longitudinal bore 72 in the inner injector body 14. Air swirler 21 imparts swirl to the inner air flow in known manner. Outer air discharging past outer air discharge lip 62 enters upstream end 74 of the outer air shroud 22 and flows past swirl vanes 75 and through air swirling chamber 76 for discharge past lip 62. As is known, the air received in the inner injector body 14 and shroud 22 is received from the upstream compressor (not shown) of the gas turbine engine. Typically, outer shroud 22 includes the mounting surface 80 downstream of the compressor so that the fuel and inner and outer air flows are discharged into the internal combustor chamber 84 for burning.

The axial position of valve member 50 and slot 44 along the longitudinal axis A of the injector tip T are located to valve fuel flow in the injector tip in a valve closed manner below a selected minimum fuel pressure (valve cracking pressure) and in a valve metering mode above that fuel pressure with the axial location of the valve member 50 being spaced upstream from discharge end E (fuel discharge orifice 56) a selected sufficient axial distance to allow the desired airblast effects on the fuel stream at the fuel discharge orifice, e.g., air filming or atomization action on the fuel on discharge lip 58 at fuel discharge orifice 56, which is essential for satisfactory performance of an airblast fuel injector, and in addition enhanced fuel distribution around the fuel discharge orifice at low fuel flow rates. In particular, inner air flow past discharge lip 60 must be allowed to film or atomize fuel on lip 58 and also by virtue of low pressure generated in fuel chamber 54 from high velocity inner air flow past lips 60 and 58, to improve distribution of fuel in chamber 54, i.e., annularly therearound, at low fuel flow rates where fuel tends to fill chamber 54 in a non-uniform manner dictated by gravity effects. As a result, the axial location of the valve member 50 is selected upstream from discharge end E as shown to permit inner air flow past lip 60 to perform its intended functions in the airblast injector.

The axial location of the valve member 50, and thus valving of the fuel flow, are also important at higher fuel flow rates where the fuel discharging from the fuel slot has a high tangential velocity component with the fuel stream, as a result, tending to immediately form multiple individual fingers of fuel which, if allowed to be present at lip 58, would interfere with or adversely affect filming (atomization) of the fuel by the inner air stream. To provide a fuel stream more amenable in terms of its velocity and configuration to filming or atomization at lip by inner air flow, the axial location of valve member 50 is spaced sufficiently upstream to allow the tangential velocity component of fuel flow to decrease while the axial velocity component increases to reduce the fuel finger effect and provide a swirling, annular fuel stream discharging from orifice 56 which is satisfactory for filming by the inner air flow from lip 60 as well as outer air flow from lip 62.

Thus, the axial location of the valve member 50 and thus of valving of the fuel flow in the valve closed manner below a selected fuel pressure and valve metering manner above that fuel pressure are effective to reduce fuel vaporization without adversely affecting the airblast operational characteristics of the fuel injector.

In addition to axially locating the valve member 50 in the aforesaid selected axial position, fuel passages downstream from the valve member 50 are sized to facilitate egress of any fuel vapor generated therein, especially during low fuel flow rate operation, and thereby avoid vapor lock in the passages. Of course, the axial positioning of the valve member 50 also shortens the length of the fuel passages downstream thereof so that fuel vapor has a shorter distance to travel for expellation from the discharge end to also avoid vapor lock therein.

Positioning of the valve member 50 in the injector tip T near the fuel discharge orifice substantially reduces fuel vaporization problems and associated vapor lock upstream thereof by maintaining a higher fuel pressure in the injector tip upstream of the spring valve and by shortening the distance between the discharge end E and valve member 50 to facilitate egress of any vapor that might be generated through the relatively uncomplicated and direct-path fuel chambers 48, 52,54,55 to the combustor chamber.

The injector construction described hereinabove is simple in design with resultant low cost, has improved reliability as no sliding valve with close tolerances is used with less susceptibility to contamination with the valve open and exhibits ease of maintenance sine the inner injector body 14 with the spring valve 50 thereon can be replaced by another precalibrated assembly. A lower cost and lighter weight fuel injector is thereby provided for a gas turbine engine. Moreover, the cracking pressure of valve 50 is readily adjusted exteriorly of the fuel injector tip T using the tool TA threaded into counterbore 22 of adjustably movable valve seat 47. As mentioned, the valve cracking pressure can be adjusted before and after assembly of the inner injection body 14 in the outer injector body 12.

While certain specific and preferred embodiments of the invention have been described in detail hereinabove, those skilled in the art will recognize that various modifications and changes can be made therein within the scope of the appended claims which are intended to include equivalents of such embodiments.

I claim:

1. An airblast fuel injector having injector body means for forming an inner air chamber with a downstream air discharge orifice, an outer air chamber with a downstream air discharge orifice and an annular fuel chamber between the inner and outer air chambers with a downstream fuel discharge orifice, said injector body means forming a passage between the annular fuel chamber and an upstream fuel inlet chamber, a valve seat member adjustably received in said passage and having a fuel bore for receiving fuel from said fuel inlet chamber and terminating in a fuel discharge port, and an arcuate spring valve disposed on the injector body means and including a cantilever end portion overlying the fuel discharge port and biased against the valve seat member over the fuel discharge port when fuel pressure is below a minimum value and openable when fuel pressure exceeds a selected value to allow fuel flow discharge from the fuel discharge port to the annular fuel chamber, said valve seat member being adjustable in position in said passage relative to the cantilever end portion of said valve from the exterior of said injector body means to adjust the valve opening pressure.

2. The injector of claim 1 wherein said passage extends to an upstream end of said injector where said passage terminates in an open end accessible from external of the injector.

3. The injector of claim 2 wherein said valve seat member is received in said passage and includes an end portion adjacent the open end of said passage, said end portion being accessible external of the injector for adjusting the position of said valve seat member in said passage relative to said cantilever end portion.

4. The injector of claim 3 wherein said end portion is deflectable in a direction toward and away from said cantilever end portion to adjust the position of the valve seat member in said passage relative to said cantilever end portion.

5. The injector of claim 4 wherein said end portion includes an annular rim attached on its outer periphery to said injector body means and having a deflectable flange extending inwardly of said rim.

6. The injector of claim 5 wherein said flange extends inwardly toward a central hub adapted to be contacted by an adjustment tool for deflecting said flange.

7. The injector of claim 4 wherein the valve seat member is movable in an axial direction in said passage.

8. The injector of claim 7 wherein said valve seat member is movable in a direction substantially parallel with the longitudinal axis of the injector.

9. The injector of claim 3 wherein the fuel bore of valve seat member is located downstream of said end portion.

* * * * *

UNITED STATES PATENT AND TRADEMARK OFFICE
CERTIFICATE OF CORRECTION

PATENT NO. : 4,962,889

DATED : October 16, 1990

INVENTOR(S) : Robert M. Halvorsen

It is certified that error appears in the above-identified patent and that said Letters Patent is hereby corrected as shown below:

Column 5, line 8, after "spring" delete ",".
Column 5, line 26, delete ",".
Column 5, line 45, delete "FIGS." and insert --FIG.--.
Column 5, line 57, delete "verse" and insert --versus--.
Column 7, line 17, delete "11?" and insert --110--.
Column 8, line 54, delete "since" and insert --since--.
Column 8, line 61, delete "22" and insert --228--.

Signed and Sealed this

Third Day of August, 1993

Attest:

MICHAEL K. KIRK

Attesting Officer

Acting Commissioner of Patents and Trademarks